United States Patent [19]

Ogawa et al.

[11] Patent Number: 4,996,604
[45] Date of Patent: Feb. 26, 1991

[54] IMAGE SCANNER

[75] Inventors: Izumi Ogawa, Shizuoka; Kazuyoshi Kurihara, Numazu; Seigo Uchida, Shizuoka; Takashi Nishijima, Numazu, all of Japan

[73] Assignee: Tokyo Electric Co., Ltd., Tokyo, Japan

[21] Appl. No.: 224,983

[22] Filed: Jul. 27, 1988

[30] Foreign Application Priority Data

Jul. 31, 1987 [JP] Japan .................. 62-193233
May 16, 1988 [JP] Japan .................. 63-64336[U]

[51] Int. Cl.$^5$ ................................ H04N 1/00
[52] U.S. Cl. ........................ 358/474; 358/486
[58] Field of Search ........... 358/285, 256, 485, 488, 358/496, 497, 498, 474

[56] References Cited

U.S. PATENT DOCUMENTS

| 4,300,169 | 11/1981 | Sato ........................ 358/256 |
| 4,317,138 | 2/1982 | Bryan ........................ 358/256 |
| 4,558,373 | 12/1985 | Plasencia ........................ 358/285 |
| 4,598,323 | 7/1986 | Honjo ........................ 358/285 |
| 4,675,741 | 6/1987 | Shinohara ........................ 358/256 |
| 4,743,976 | 5/1988 | Katakabe ........................ 358/285 |
| 4,751,582 | 6/1988 | Koseki ........................ 358/256 |
| 4,755,877 | 7/1988 | Vollert ........................ 358/285 |
| 4,768,100 | 8/1988 | Kunishima ........................ 358/285 |
| 4,872,061 | 10/1989 | Uchiyama ........................ 358/474 |

FOREIGN PATENT DOCUMENTS 57-148461 9/1982 Japan .
61-208970 9/1986 Japan .
0082756 4/1987 Japan .

Primary Examiner—Edward L. Coles, Sr.
Assistant Examiner—Jerome Grant, II
Attorney, Agent, or Firm—Frishauf, Holtz, Goodman & Woodward

[57] ABSTRACT

An image scanner includes a convey path for a document sheet, convey rollers for moving the document sheet along the convey path, an image sensor for reading an image from the document sheet while said document sheet passes in front of said image sensor, and a driving section for driving said convey rollers to move the document sheet forward. The driving section of the image scanner drives the convey rollers to move the document sheet backward it is detected that the document sheet has passed the image sensor.

5 Claims, 5 Drawing Sheets

IMAGE SCANNER

BACKGROUND OF THE INVENTION

1. Field of the Invention

The present invention relates to an image scanner for reading an image, which is processed by, e.g., a computer, from a document sheet and, more particularly, to an image scanner of a type in which a document sheet is moved to read an image.

2. Description of the Related Art

An image scanner having an inlet and an outlet for document sheets in its front and rear surfaces is conventionally known. When a document sheet is inserted in the inlet of this image scanner, the document sheet is conveyed to the outlet through a portion near an image sensor, and is discharged from the outlet onto an external tray. This tray is mounted on the rear surface of the housing so as to prevent wrinkles and contamination of document sheets. An image is read by moving a document sheet relative to the image sensor.

In conventional image scanners, a tray tends to occupy a large space when a large-size document sheet is used. In addition, since discharged document sheets must be recovered at the back of the image scanner, operability is degraded.

SUMMARY OF THE INVENTION

It is an object of the present invention to provide an image scanner which can reduce an installation space and improve operability.

In order to achieve this object, there is provided an image scanner comprising a convey path for a document sheet, a plurality of convey rollers for moving the document sheet along the convey path, an image sensing section disposed at a position between first and second ends of the convey path for reading an image from the document sheet while the document sheet passes in front of the image sensing section, and a driving section for driving the convey rollers to move the document sheet toward the second end of said convey path when the document sheet is initially set at an end region including the first end of the convey path, and for driving the convey rollers to move the document sheet back to the end region after the document sheet has passed the image sensing section According to this image scanner of the present invention, a document sheet is conveyed from the end region to the image sensor section, and is returned to the end region after an image has been read from the document sheet by the image sensor section. Therefore, the document sheet need not be stored in a discharge tray after reading of the image, and a space occupied by the image scanner can be reduced. In addition, since the document sheet can be recovered from the end region at the first end after reading of the image, this recovery operation is facilitated.

DETAILED DESCRIPTION OF THE PREFERRED EMBODIMENT

Figure 1:
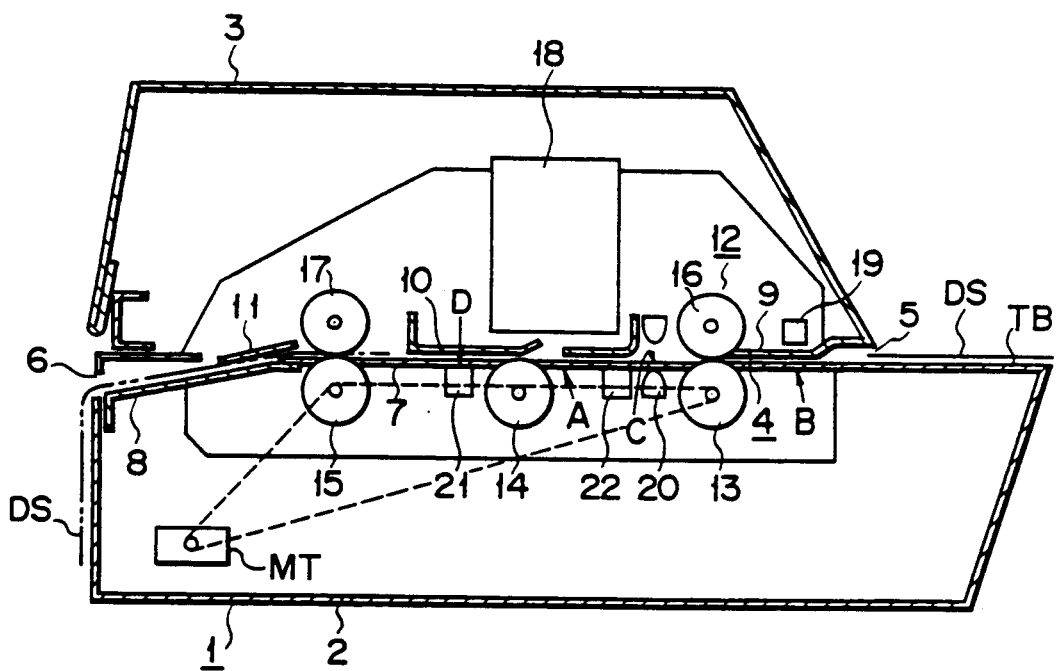
FIG. 1 is a schematic view showing the interior of an image scanner according to an embodiment of the present invention.

An image scanner according to an embodiment of the present invention will be described below with reference to FIGS. 1 to 3B. FIG. 1 schematically shows the structure of the image scanner according to this embodiment. The image scanner comprises lower and upper cases 2 and 3, and housing 1. Lower and upper cases 2 and 3 are detachably coupled to each other through convey path 4 as a boundary. In addition, the image scanner comprises inlet 5, outlet 6, table TB, and guide plates 7, 8, 9, 10, and 11. Guide plates 7 and 8 are mounted on lower case 2, whereas guide plates 9, 10, and 11 are mounted on upper case 3. Convey path 4 is formed by arranging guide plates 7 and 8 to oppose guide plates 9, 10, and 11. Inlet 5 and outlet 6 are respectively formed in the front and rear surfaces of housing 1, and communicate with convey path 4. Table TB is arranged along the lower end of inlet 5. Document sheet DS is placed on table TB and is slid to be inserted in inlet 5.

The image scanner further comprises convey mechanism 12 for conveying document sheet DS inserted through inlet 5 along convey path 4, position sensors 19, 20, and 21 for detecting a current position of document sheet DS, and image sensor 18 for reading an image from document sheet DS. Convey mechanism 12 includes drive rollers 13, 14, and 15 mounted on lower case 2 along convey path 4, press rollers 16 and 17 mounted on upper case 3 along convey path 4, and motor MT coupled to rollers 13, 14, and 15. The shafts of rollers 13, 14, 15, 16, and 17 extend in the widthwise direction of convey path 4. Rollers 13, 14, and 15 are driven by motor MT and are selectively rotated in one direction, i.e., clockwise or counterclockwise. Rollers 16 and 17 are in elastic contact with rollers 13 and 15, and are rotated upon rotation of rollers 13 and 15. Rollers 15 and 17 have enough resistance to prevent at least idling due to the weight of document sheet DS while a driving force is not supplied from motor MT to roller 15.

Image sensor 18 is mounted on upper case 3, and reads an image while document sheet DS passes position A on convey path 4 between the pair of rollers 13 and 16, and the pair of rollers 15 and 17. Position sensor 19 is a reflection type photosensor mounted on upper case 3, and checks whether document sheet DS is located at position B on convey path between inlet 5 and the pair of rollers 13 and 16. Position sensor 20 is a transmission type photosensor having light-emission and -receiving portions separately mounted on lower and upper cases 2 and 3, and checks whether document sheet DS is located at position C on convey path 4 between the pair of rollers 13 and 16 and image sensor 18. Position sensor 21 is a reflection type photosensor, mounted on lower case 2, and checks whether document sheet DS is located at position D on convey path 4 between image sensor 18 and the pair of rollers 15 and 17. Each of position sensors 19, 20, and 21 generates output signal "1" when it detects that document sheet DS is located at a corresponding position. When each of the sensors detects that document sheet DS is not located at a corresponding position, it generates output signal "0". The image scanner comprises line sensor 22 at a position on convey path 4 between position sensor 20 and image sensor 18. Line sensor 22 comprises a plurality of reflection type photosensors mounted on lower case 2 in a row in the widthwise direction of convey path 4. Line sensor 22 detects the size of document sheet DS in the widthwise direction of convey path 4 and that document sheet DS is conveyed in a tilted state.

Figure 2:
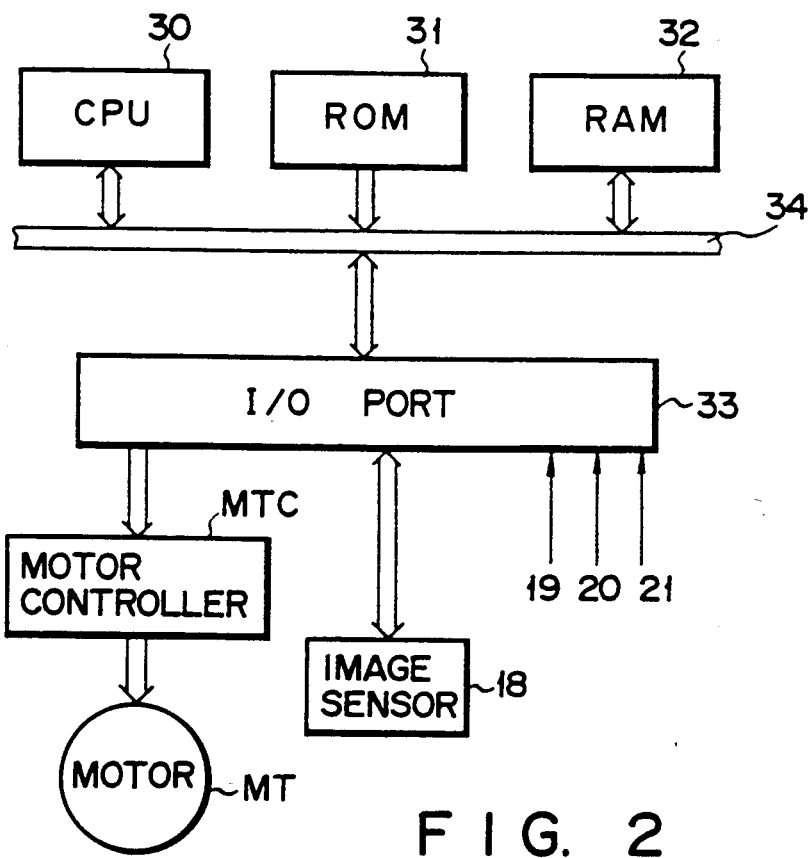
FIG. 2 is a view showing a control circuit of the image scanner in FIG. 1.
Figure 3A:
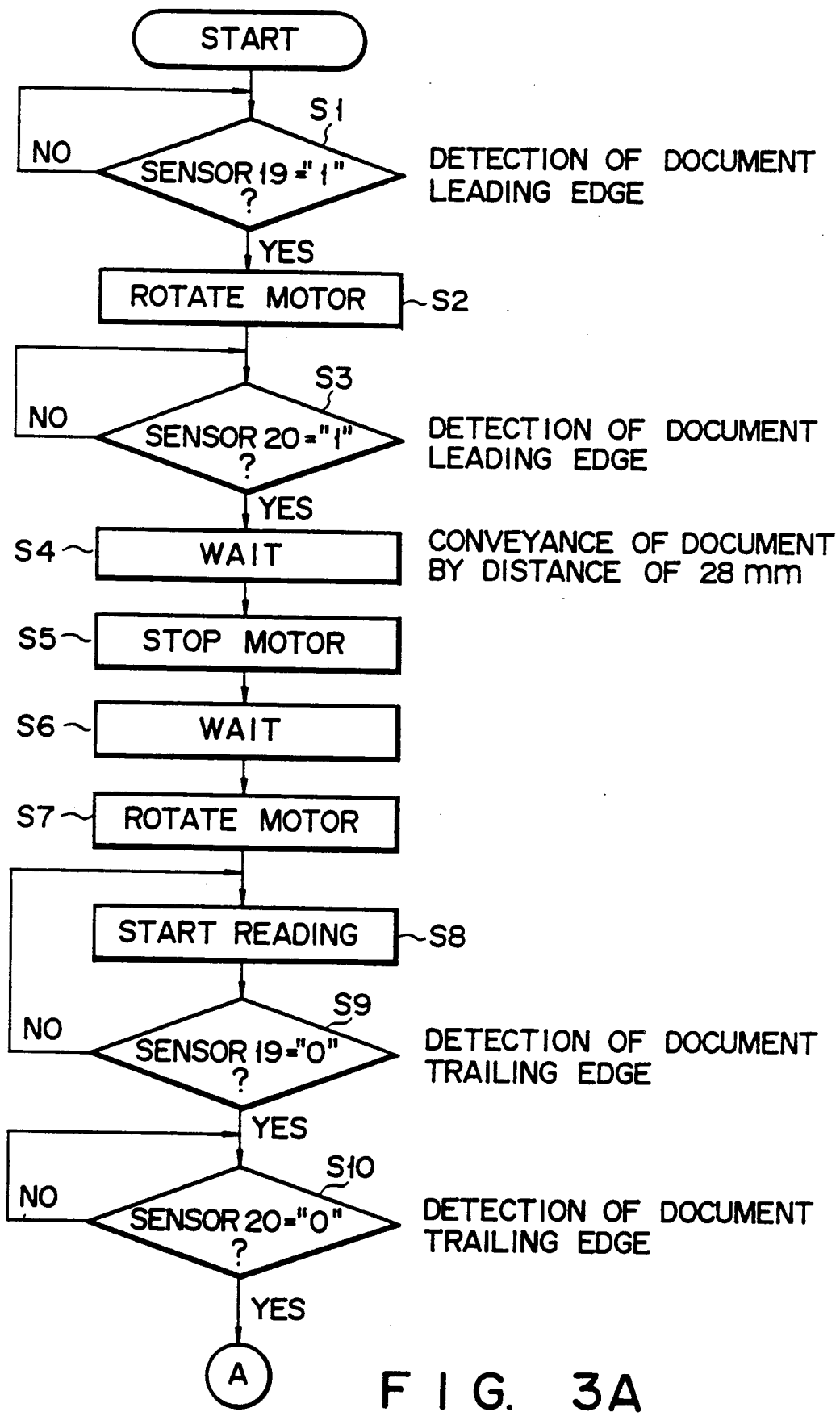
FIGS. 3A and 3B are flow charts showing an operation of the control circuit in FIG. 2.
Figure 3B:
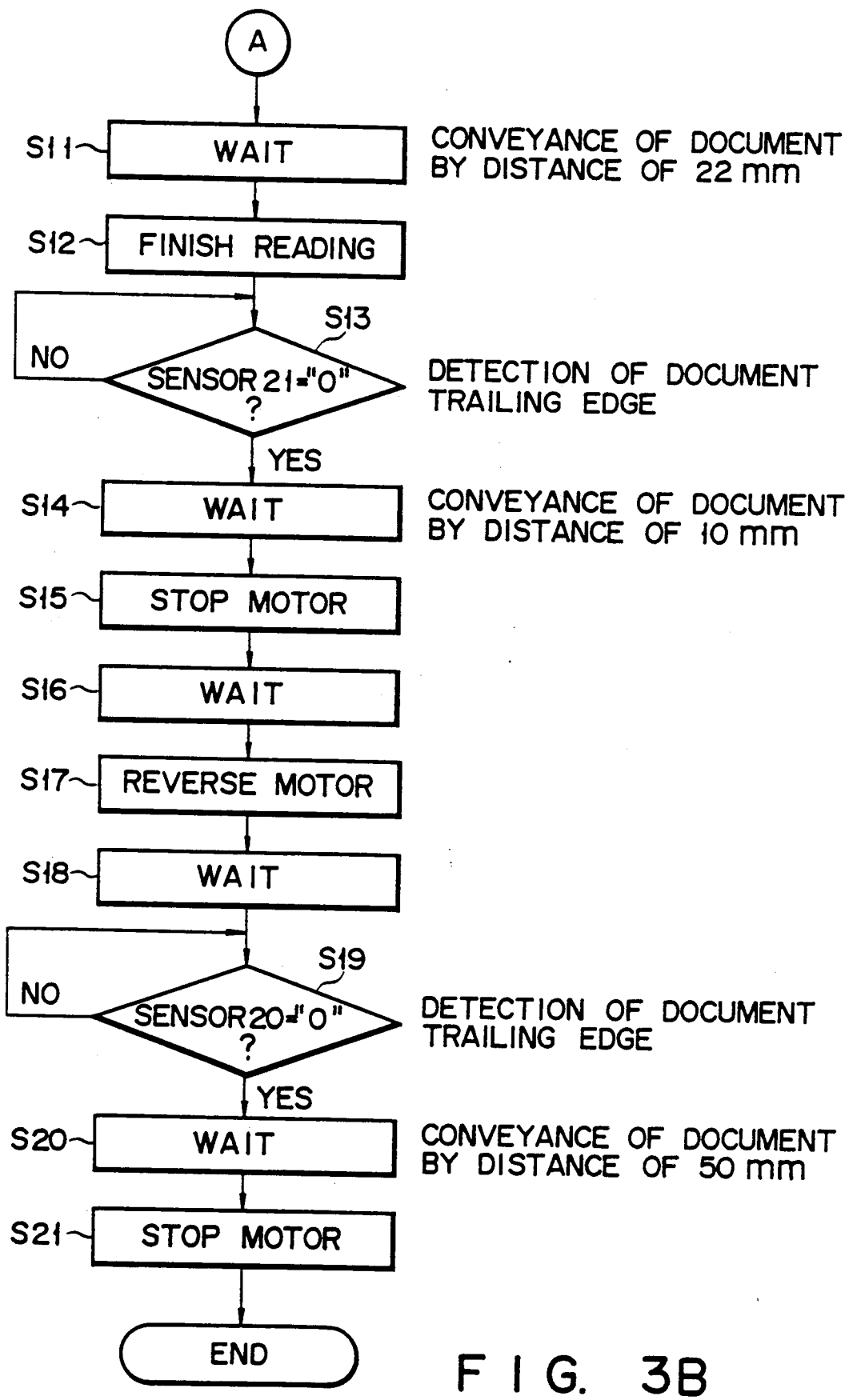

FIG. 2 shows a control circuit of the image scanner. The control circuit comprises CPU 30, ROM 31, RAM 32, I/O port 33, and BUS 34 for mutually connecting them. ROM 31 stores control programs of CPU 30. RAM 32 temporarily stores input/output data of CPU 30. Motor controller MTC, image sensor 18, and sensors 19, 20, 21, and 22 are connected to I/O port 33. I/O port 33 supplies output signals generated by sensors 19, 20, 21, and 22 to CPU 30, supplies a read control signal generated by CPU 30 to image sensor 18, and supplies start control and direction control signals generated by CPU 30 to motor controller MTC. Motor MT is connected to motor controller MTC. Motor controller MTC drives motor MT in accordance with the start control and direction control signals. The rotational speed of motor MT is kept constant in a normal state.

An operation of this image scanner will be described below. When a power source is turned on, CPU 30 reads a control program from ROM 31 and executes the program. With this operation, convey mechanism 12 is controlled in accordance with the flow chart shown in FIGS. 3A and 3B. When the flow is started, an output signal from sensor 19 is checked in step S1. Step S1 is repeatedly executed while the output signal from sensor 19 is detected to be "0". When an output signal from sensor 19 is detected to be "1", motor MT is started in step S2 so as to rotate rollers 13, 14, and 15 counterclockwise. In step S3, an output signal from sensor 20 is checked. Step S3 is repeatedly executed while the output signal from sensor 20 is detected to be "0". When an output signal from sensor is detected to be "1", a time required to move document sheet DS forward by a distance (28 mm) equal to the distance from position C to position A is waited in step S4. Then, in step S5, motor MT is stopped. In step S6, one second is waited. In step S7, motor MT is started to rotate rollers 13, 14, and 15 counterclockwise In step S8, a read operation of image sensor 18 is started. An output signal from sensor 19 is checked in step S9. Steps S8 and S9 are repeatedly executed while the output signal from sensor 19 is detected to be "0". When an output signal from sensor 19 is detected to be "1", an output signal from sensor 20 is checked in step S10. Step S10 is repeatedly executed while the output signal from sensor 20 is detected to be "0". When an output signal from sensor 20 is detected to be "1", a time required to move document sheet DS forward by a distance (22 mm) slightly shorter than the distance from position C to position A is waited in step S11. Immediately after an image has been read out from the last line in document sheet DS, in step S12, the reading operation of image sensor 18 is stopped. In step S13, an output signal from sensor 21 is checked. Step S13 is repeatedly executed while the output signal from sensor 21 is detected to be "1". When an output signal from sensor 20 is detected to be "0", a time required to move document sheet DS forward by a distance (10 mm) smaller than the distance from position D to the pair of rollers 15 and 17 is waited in step S14. Then, motor MT is stopped in step S15, and one second is waited in step S16. Subsequently, motor MT is started in step S17 to rotate rollers 13, 14, and 15 counterclockwise. In step S18, a time required to move document sheet DS backward by a distance (65 mm) slightly larger than the distance from the stop position to position C is waited. In step S19, an output signal from sensor 20 is checked. Step S19 is repeatedly executed while the output signal from sensor 20 is detected to be "0". When an output signal from sensor 20 is detected to be "1", a time required to move document sheet DS backward by a distance (50 mm) equal to the distance from position C to position B is waited in step S20. Then, motor MT is stopped in step S22.

That is, when document sheet DS is inserted in inlet 5 and its leading edge reaches the position of the pair of rollers 13 and 16, document sheet DS is pulled by the pair of rollers 13 and 16 and is moved forward to outlet 6. An image is read by image sensor 18 from document sheet DS while it passes position A. When this read operation is finished and passage of the trailing edge of document sheet DS at position D is detected, the convey direction is reversed before the trailing edge of document sheet DS reaches the pair of rollers 15 and 17 so that document sheet DS is returned to the insertion position.

As is described above, an image is read while document sheet DS is conveyed inwardly from inlet 5. In this case, even if the leading edge of document sheet DS is discharged from outlet 6 in the rear surface of housing 1 as indicated by the alternate long and short dash line in FIG. 1, since the trailing edge is sandwiched by drive roller 15 and press roller 17 and document sheet DS is returned to inlet 5 afterward, a tray for storing document sheet DS need not be arranged on the rear surface of housing 1. Therefore, the installation space of the image scanner can be reduced. In addition, since insertion and recovery of document sheet DS can be performed at the front of the image scanner, operability can be improved.

In the above-described embodiment, a case is described wherein a timing of stopping motor M7 is set using a detection signal from sensor 20 as a reference in the process of returning document sheet DS to inlet 5 of convey path 4. However, sensor 20 may be limited to a function of only setting the read start timing of image sensor 18. In this case, motor MT is rotated in the reverse direction in response to a detection signal from sensor 21 as a reference upon completion of reading, and motor MT is stopped after a predetermined period of time is elapsed by using a soft program or a timer.

Figure 4:
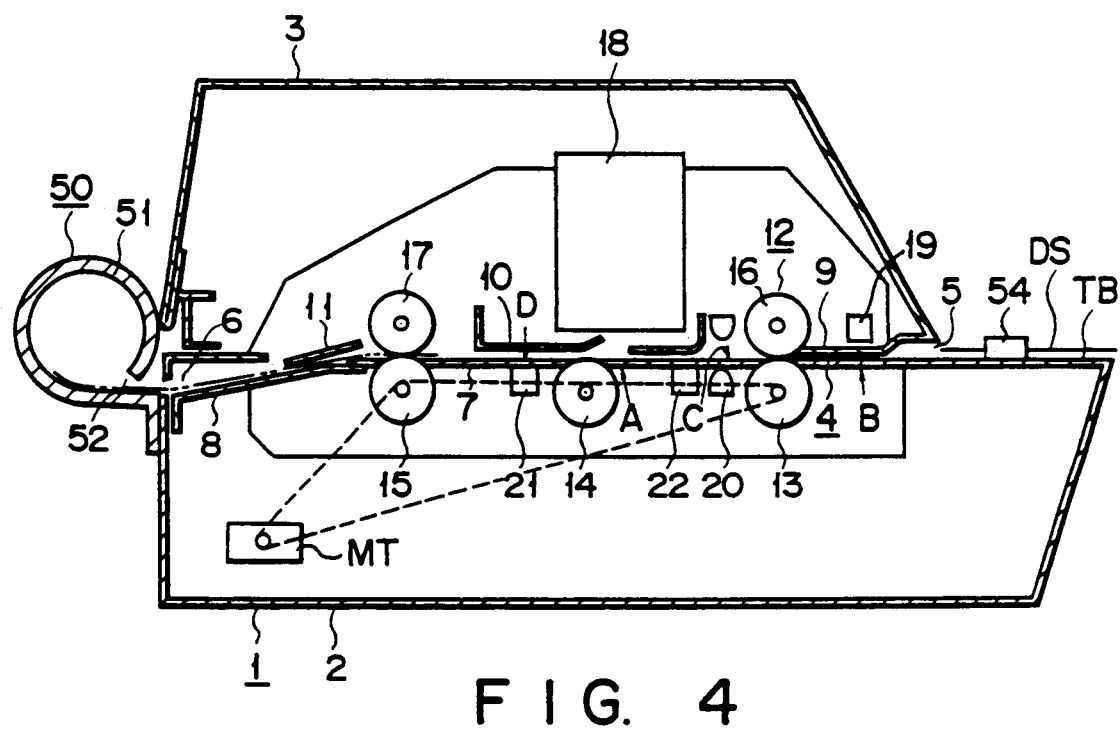
FIGS. 4 and 5 are views showing a first modification of the image scanner in FIG. 1.
Figure 5:
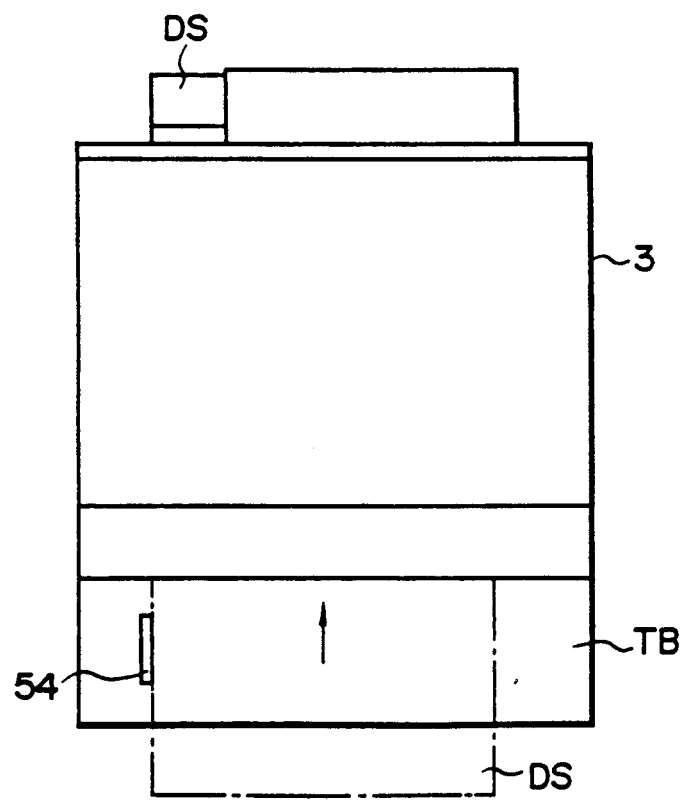

A first modification will be described with reference to FIGS. 4 and 5. The same reference numerals in FIGS. 4 and 5 denote the same parts as in FIG. 1, and a description thereof will be omitted. Document storage section 50 is fixed to the rear surface of lower case 2. Document storage section 50 has horizontally elongated opening 52 communicating with document convey path 4 via outlet 6. Opening 52 is formed in part of wall 51 having an axis perpendicular to the document convey direction. Opening 52 is opened in a tangential direction of wall 17 and is directed to outlet 6. Both the ends of document storage section 50 are opened, and the left end is located nearer to the center of housing 1 than guide 54, as shown in FIG. 5.

In the process of conveying document sheet DS to the rear portion of housing 1 to read an image in such an arrangement, document sheet DS is discharged from outlet 6 of convey path 4, and then is guided into document storage section 50 through opening 52. At this time, document sheet DS itself has a tendency to move straight, but is guided by wall 51 and is wound in the form of a roll. In addition, since document guide 54 for guiding the left edge of document sheet DS is located at the left side separated from the left end of document storage section 50 as shown in FIG. 5, the left end of document sheet DS is exposed from the left end of document storage section 50. Therefore, when line sensor 22 detects occurrence of an abnormality and conveyance of document sheet DS is controlled such that document sheet DS is completely sent out from outlet 6 of convey path 4, document sheet DS can be taken out from the left end of document storage section 50. When document sheet DS is returned to inlet 5 in a normal operation, motor MT is temporarily stopped in the process of reading an image while the trailing edge of document sheet DS is in contact with drive roller 15, and then drive rollers 13, 14, and 15 are driven clockwise in FIG. 4.

In any case, since document sheet DS is wound in the form of a roll and temporarily stored in document storage section 50, a large space for holding document sheet DS at the back of housing 1 is not required. Thus, an operation can be easily performed even in a small working space.

Figure 6:
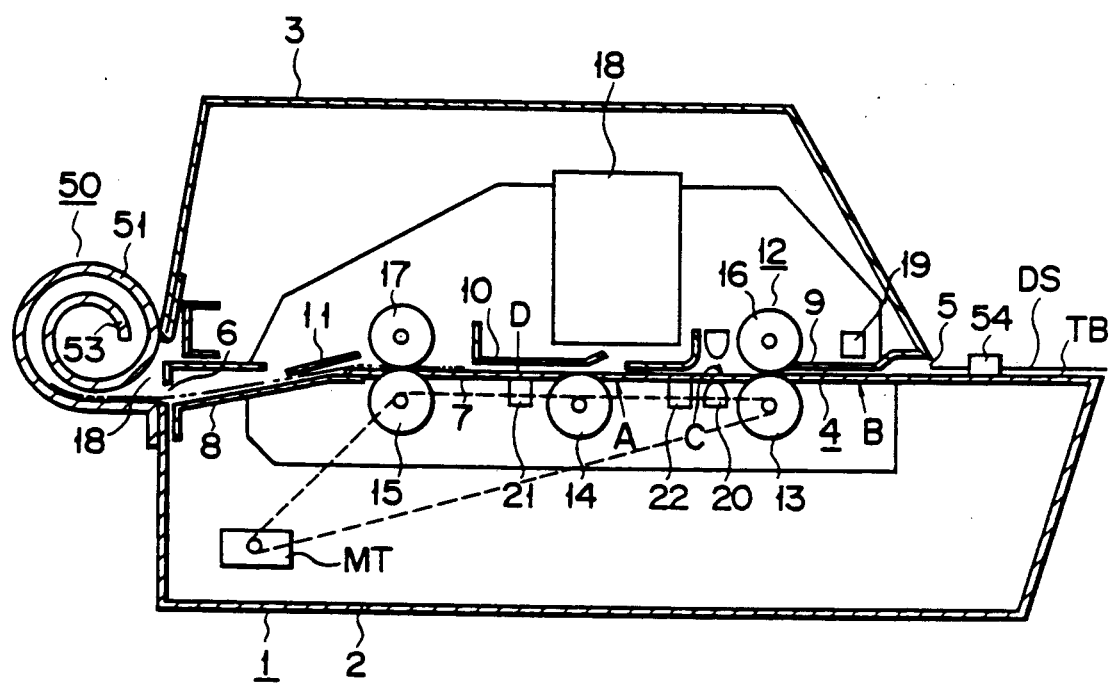
FIG. 6 is a view showing a second modification of the image scanner in FIG. 1.

FIG. 6 shows a second modification of the embodiment. In this modification, guide surface 53 extends spirally toward the axis of document storage section 50 so as to be continuous with wall 51.

Since wound surfaces of document sheet DS are partitioned from each other by guide surface 53 in document storage section 50, friction between the wound surfaces of document sheet DS is reduced. With this arrangement, document sheet DS can be conveyed into document storage section 50 without stagnation and is orderly wound in the form of a roll.

What is claimed is:

1. An image scanner comprising:
   a convey path for a document sheet, said convey path having first and second ends, one of said ends including a document sheet inserting and collecting region;
   a plurality of convey rollers for moving the document sheet along said convey path;
   image sensing means, disposed at a position between the first and second ends of said convey path, for reading an image from said document sheet while said document sheet passes in front of said image sensing means; and
   driving means for driving said convey rollers to move the document sheet toward the second end of said convey path and past said image sensing means when the document sheet is initially set at said inserting and collecting region of said convey path, and for driving said convey rollers and to move the document sheet back past said image sensing means and back to said inserting and collecting region of said convey path after the document sheet has passed said image sensing means;
   said plurality of convey rollers including a pair of rollers disposed at a position between said image sensing means and the second end of said convey path and cooperatively coupled with each other to prevent an idle movement of said document sheet;
   said driving means including control means for causing a rotational direction of said convey rollers to be reversed while a trailing edge of said document sheet is moved between said image sensing means and the pair of said rollers.

2. An image scanner according to claim 1, wherein said control means includes a position sensor disposed at a position between said image sensing means and the pair of said rollers for generating an output signal indicating the presence or absence of said document sheet, and a checking circuit means for repeatedly checking the output signal of said position sensor means after a period required for said document sheet to be moved from said end region to the position of said position sensor means has elapsed, thereby detecting that the trailing edge of said document sheet has passed said position sensor means.

3. An image scanner comprising:
   a convey path for a document sheet, said convey path having first and second ends, one of said ends including a document sheet inserting and collecting region;
   a plurality of convey rollers for moving the document sheet along said convey path;
   image sensing means, disposed at a position between the first and second ends of said convey path, for reading an image from said document sheet while said document sheet passes in front of said image sensing means;
   driving means for driving said convey rollers to move the document sheet toward the second end of said convey path and past said image sensing means when the document sheet is initially set at said inserting and collecting region of said convey path, and for driving said convey rollers and to move the document sheet back past said image sensing means and back to said inserting and collecting region of said convey path after the document sheet has passed said image sensing means;
   a cylindrical document storage section which includes a wall having an axis substantially perpendicular to the document convey direction and a horizontally elongated opening formed in part of said wall and communicating with the second end of said convey path; and
   said driving means including control means for causing a rotational direction of said convey rollers to be reversed while a trailing edge of said document sheet is moved between said image sensing means and the second end of said convey path.

4. An image scanner according to claim 3, wherein said document storage section further includes a guide surface extending spirally toward said axis so as to be continuous with said wall.

5. An image scanner according to claim 3, wherein said control means includes a position sensor means disposed at a position between said image sensing means and the second end of said convey path for generating an output signal indicating the presence or absence of said document sheet, and a checking circuit means for repeatedly checking the output signal of said position sensor means after a period required for said document sheet to be moved from said end region to the position of said position sensor means has elapsed, thereby detecting that the trailing edge of said document sheet has passed said position sensor means.

* * * * *

UNITED STATES PATENT AND TRADEMARK OFFICE
CERTIFICATE OF CORRECTION

PATENT NO. : 4,996,604
DATED : February 26, 1991
INVENTOR(S) : OGAWA et al

It is certified that error appears in the above-identified patent and that said Letters Patent is hereby corrected as shown below:

Title page, Abstract, next-to-last line:

Change "backward it is detected" to

--backward toward its initial position after it is detected--.

Signed and Sealed this

Fifteenth Day of September, 1992

Attest:

DOUGLAS B. COMER

*Attesting Officer*   Acting Commissioner of Patents and Trademarks